US010259752B2

(12) United States Patent
Stemann et al.

(10) Patent No.: US 10,259,752 B2
(45) Date of Patent: Apr. 16, 2019

(54) PRODUCTION OF CITRATE SOLUBLE PHOSPHATES BY CALCINATION OF SECONDARY PHOSPHATE SOURCES WITH A SODIUM-SULFURIC COMPOUND

(71) Applicants: Outotec (Finland) Oy, Espoo (FI); Bundesrepublik Deutschland, vertreten durch das, Bundesministerium für Wirtschaft und Energie, Berlin (DE)

(72) Inventors: Jan Stemann, Berlin (DE); Christian Adam, Berlin (DE); Ludwig Hermann, Auersthal (AT)

(73) Assignees: OUTOTEC (FINLAND) OY, Espoo (FI); BUNDESREPUBLIK DEUTSCHLAND, VERTRETEN DURCH DAS BUNDESMINSITERIUM FÜR WIRTSCHAFT UND ENERGIE, DIESES VERTRETEN DURCH DEN PRÄSIDENTEN DER BAM, BUNDESANSTALT FÜR MATERIALFORSCHUNG UND -PRÜFUNG, Berlin (DE)

( * ) Notice: Subject to any disclaimer, the term of this patent is extended or adjusted under 35 U.S.C. 154(b) by 184 days.

(21) Appl. No.: 15/314,358

(22) PCT Filed: Jun. 11, 2015

(86) PCT No.: PCT/EP2015/063062
§ 371 (c)(1),
(2) Date: Nov. 28, 2016

(87) PCT Pub. No.: WO2015/189333
PCT Pub. Date: Dec. 17, 2015

(65) Prior Publication Data
US 2018/0244587 A1    Aug. 30, 2018

(30) Foreign Application Priority Data

Jun. 11, 2014   (DE) .................. 10 2014 108 199

(51) Int. Cl.
*C01B 25/45*     (2006.01)
*C05B 13/00*     (2006.01)
(Continued)

(52) U.S. Cl.
CPC .............. *C05B 13/06* (2013.01); *C01B 25/26* (2013.01); *C01B 25/45* (2013.01); *C05B 1/04* (2013.01);
(Continued)

(58) Field of Classification Search
None
See application file for complete search history.

(56) References Cited

U.S. PATENT DOCUMENTS

| 1,173,303 A | | 2/1916 | Newberry et al. |
| 2,478,200 A | * | 8/1949 | Maust ..................... C05B 13/02 71/44 |

(Continued)

FOREIGN PATENT DOCUMENTS

| DE | 10217956 A1 | 1/2004 |
| EP | 1767509 A1 | 3/2007 |

(Continued)

OTHER PUBLICATIONS

Derbunovich, N. N., "Conversion of mills producing feed tricalcium phosphate to the production of fertilizer", Khimicheskaya Promyshlennost (Moscow, Russian Federation) (1988), (12), 722-5.*

(Continued)

*Primary Examiner* — Wayne A Langel
(74) *Attorney, Agent, or Firm* — Robert P. Michal, Esq.; Carter, DeLuca & Farrell LLP

(57) ABSTRACT

A method of calcination includes providing a raw material including whitlockite $Ca_9(Mg,Fe^{2+})[PO_3(OH)|(PO_4)_6]$, and/or iron phosphate $FePO_4$, and/or aluminum phosphate $AlPO_4$ and/or fluorapatite $Ca_5(PO_4)_3F$; providing an alka-
(Continued)

line-sulfuric compound as an additive; and calcining a mixture of the raw material with the additive to obtain a product, including a citrate soluble phosphate compound.

23 Claims, 1 Drawing Sheet

(51) Int. Cl.
| | |
|---|---|
| *C05B 13/04* | (2006.01) |
| *C05B 13/06* | (2006.01) |
| *C05B 13/02* | (2006.01) |
| *C01B 25/26* | (2006.01) |
| *C05B 7/00* | (2006.01) |
| *C05B 1/04* | (2006.01) |

(52) U.S. Cl.
CPC ............ *C05B 7/00* (2013.01); *C05B 13/00* (2013.01); *C05B 13/02* (2013.01); *C05B 13/04* (2013.01)

(56) References Cited

U.S. PATENT DOCUMENTS

| | | | | |
|---|---|---|---|---|
| 3,713,803 | A | 1/1973 | Holst et al. | |
| 3,897,575 | A * | 7/1975 | White | C05B 13/02 426/511 |
| 4,039,624 | A * | 8/1977 | Hill | C01B 25/22 423/157.3 |
| 4,106,922 | A * | 8/1978 | Hauschild | C05B 13/02 423/157.2 |
| 4,716,026 | A * | 12/1987 | Gruber | C05B 13/02 423/157.3 |
| 4,765,822 | A * | 8/1988 | Barber | B01D 53/68 423/301 |
| 8,206,670 | B2 * | 6/2012 | Detournay | C01F 11/46 423/244.07 |
| 2003/0167811 | A1 * | 9/2003 | Porubcan | C05B 1/00 71/6 |

FOREIGN PATENT DOCUMENTS

| | | |
|---|---|---|
| EP | 2725001 A1 | 4/2014 |
| GB | 19045 | 11/1911 |
| GB | 301022 A | 7/1929 |
| GB | 300961 A | 10/1929 |
| GB | 473520 A | 10/1937 |
| GB | 513744 A | 10/1939 |
| GB | 902361 A | 8/1962 |
| JP | 2002-177769 A | 6/2002 |
| JP | 2004-203641 A | 7/2004 |
| JP | 2004-330039 A | 11/2004 |
| JP | 2010-189243 A | 9/2010 |
| JP | 2013-147382 A | 8/2013 |

OTHER PUBLICATIONS

Gavrilov, A. G., "Thermodynamics of the formation of thermophosphate in a phosphate-sulfate-reducing agent system", Vestnik L vovskogo Politekhnicheskogo Instituta (1975), 95, 124-9.*
Mohajir, Akhtar et al, "Phosphate fertilizers. II. Monocalcium tetrasodium phosphate and monocalciunn tetrapotassiunn phosphate", Journal of the Indian Chemical Society, Industrial and News Edition (1955), 18, 199-202 (Abstract only).*
Glistenko, N. I., "Reaction of local phosphorites with sodium sulfate in the presence of carbon", Trudy Voronezh Univ. (1953), 28, 16-18 (Abstract only).*
Kadushkina, L. A. et al, "A citrate-soluble form of P2O5 in baked phosphates", Izvest. Akad. Nauk Kazakh. S. S. R. (1953), No. 120 (Ser. Khim. No. 5), 107-15.*
Bobrownicki, W. et al, "Preparation and the structure of calcined sodium calcium phosphate (superthomassine). I. Superthomassine with molar ratio Na2O:P2O5 = 1", Przemysl Chemiczny (1962), 41, 699-702 (Abstract only).*
Mozhaeva, G.M., "Thermic phosphates and means of increasing their fertilizing capacity", Ref, Zh., Biol. 1962, No. 7, Abstr. 4D199 (Abstract only).*
Mohajir, Akhtar; Datar, D. S., "Studies on Phospahate Fertilizers. Part II. Monocalcium tetrasodium phosphate and monocalcium tetrapotassium phosphate", Journal of the Indian Chemical Society, Industrial and News Edition (1955), 18, 199-202.*
Shane Donatello et al: "Recycling and recovery routes for incinerated sewage sludge ash (ISSA): A review", Waste Management, vol. 33, No. 11, Jun. 29, 2013 (Jun. 29, 2013), pp. 2328-2340, XP028734885,ISSN: 0956-053X, DOI: 10.1016/J.WASMAN.2013.05.024 p. 2335, paragraph 3.5—p. 2336.
Written Opinion of the International Searching Authority issued by the European Patent Office in relation to International Application No. PCT/EP2015/063062 dated Sep. 15, 2015 (8 pages).
International Search Report issued by the European Patent Office in relation to International Application No. PCT/EP2015/063062 dated Sep. 15, 2015 (4 pages).
Notification of Transmittal of the International Preliminary Report on Patentability issued by the European Patent Office in relation to International Application No. PCT/EP2015/063062 dated Sep. 19, 2016 (21 pages).

* cited by examiner

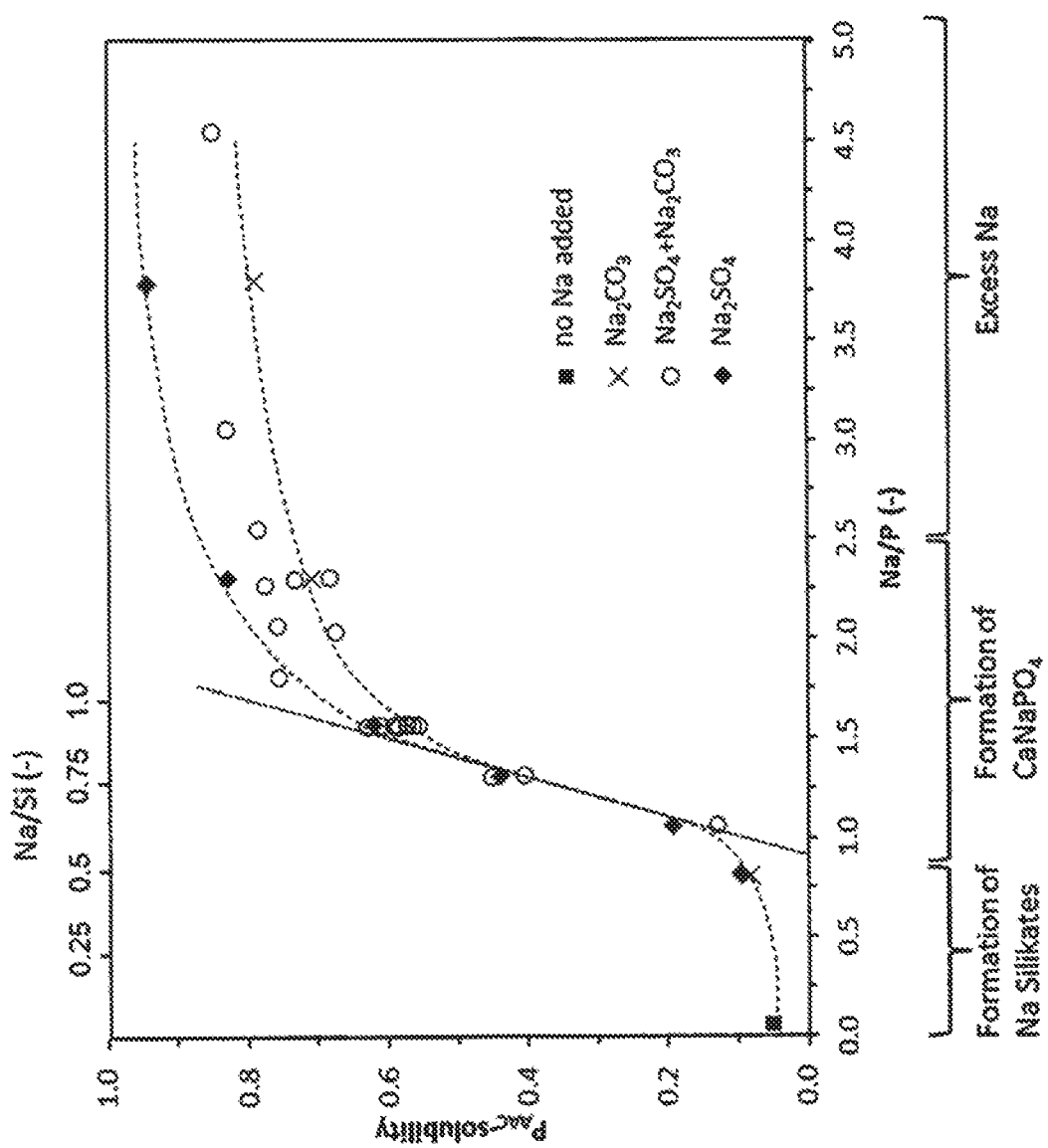

PRODUCTION OF CITRATE SOLUBLE PHOSPHATES BY CALCINATION OF SECONDARY PHOSPHATE SOURCES WITH A SODIUM-SULFURIC COMPOUND

This application is a National Phase Entry under 35 USC § 371 of PCT Patent Application Serial No. PCT/EP2015/063062 filed Jun. 11, 2015, which claims priority to German Patent Application No. 10 2014 108 199.4, filed Jun. 11, 2014, the disclosure of each of these applications is expressly incorporated herein by reference in their entirety.

The present invention relates to fertilizers and fertilizer production. In particular, the present invention relates to phosphorus recovery and phosphorus fertilizers produced from secondary raw materials, especially from sewage sludge and thus to waste treatment.

Known methods of sewage sludge treatment and disposal encompass incineration and/or combustion. Since the resulting ashes comprise a major waste stream for phosphorus recovery, heavy metal depletion is an important task.

A two step process for heavy metal removal from such ashes is described, e.g., in WO 2013/190116. The ashes are heated to a temperature of between 700° C. and 1.100° C. in a first reactor, where combustion gases are withdrawn. Subsequently the starting material is transferred to a second reactor where chlorides of alkaline and earth alkaline metals are added. Although the formed heavy metal chlorides are effectively removed, the citrate solubility of the resulting phosphate compounds is limited to about 30-40%.

According to a reported modification of the two step process alkaline or earth alkaline carbonates or hydroxides, such as sodium carbonates, sodium hydroxides, potassium carbonates and potassium hydroxides with a preference for soda ash ($Na_2CO_3$) are added in the second reactor. Furthermore, carbonaceous reducing agents are added to adjust a reducing atmosphere in order to remove volatile heavy metals. Although heavy metal removal is less effective, high citrate solubility (70-100%) of phosphate compounds is achieved. However, the mentioned additives disadvantageously share a low efficiency and a high $CO_2$ footprint.

GB 473520 describes a process aiming at the production of improved alkali-earth alkaline fertilizers by heating a mixture of phosphate rock, alkali metal sulfate (Glauber's salt or potassium sulfate) and a carbonaceous reducing agent. The process is limited to rock phosphate. In addition thereto, Glauber's salt ($Na_2SO_4.10H_2O$) imports a large amount of water to the thermal process and hence requires considerably more energy resulting in a similar environmental footprint. Furthermore, Glauber's salt is less efficient than sodium carbonate. The conceivable alternative "dry" potassium sulfate ($K_2SO_4$) is even less reactive and more expensive than soda ash.

According to an embodiment a method of calcination is suggested, comprising:
  providing a raw material comprising whitlockite $Ca_9(Mg, Fe^{2+})[PO_3(OH)|(PO_4)_6]$, and/or iron phosphate $FePO_4$, and/or aluminium phosphate $AlPO_4$ and/or fluorapatite $Ca_5(PO_4)_3F$
  providing an alkaline-sulfuric compound as an additive;
  calcining a mixture of the raw material with the additive to obtain a product, comprising a citrate soluble phosphate compound.

Advantageously, this method allows converting the raw materials into a product which in contrast to whitlockite, iron phosphate, aluminium phosphate and fluorapatite easily releases a phosphate. Particularly, the phosphate of the indicated raw materials is made bioavailable by applying the suggested method. The product can be used in agriculture for improving soil fertility, e.g., by producing a fertilizer. Advantageously, this method unlike others does not require a second reactor.

According to an embodiment of the suggested method, the citrate soluble phosphate compound comprises $CaNaPO_4$.

Advantageously, $CaNaPO_4$ is well soluble in aqueous solutions comprising citrate which indicates plant availability of the phosphorus.

According to an embodiment of the suggested method, the calcining proceeds under reducing conditions at a temperature of 800-1100° C., preferably at 850-1000° C.

Advantageously, industrial equipment such as thermal reactors or furnaces exist which can be routinely operated at the indicated temperatures.

According to an embodiment $CaNaPO_4$ is a main phosphate phase in the product.

Advantageously, this way the main amount of phosphorus immobilized in the raw material can be mobilized, i.e. converted into a compound easily releasing phosphate. The phosphorus in $CaNaPO_4$ is bioavailable to plants.

According to an embodiment of the suggested method the alkaline-sulfuric compound is selected from a sodium-sulfuric compound and/or a potassium sulphuric compound. Different alkaline-sulfuric compounds can be mixed.

Advantageously, the sulfurfraction of a sodium-sulfuric compound and the potassium-sulfuric fraction of a potassium-sulfuric compound remain in the calcined product as valuable macro nutrients.

According to an embodiment of the suggested method an amount of the alkaline-sulfuric compound is correlated to a content of phosphorus and a content of silicon in the raw material. In particular, the sodium-sulfuric compound is correlated to a content of phosphorus and a content of silicon in the raw material. Further details are given below.

Advantageously, that allows taking into consideration an amount of ions which will be entrapped by silicates and hence does not contribute to a chemical reaction. Particularly, such ions may contribute less to a desired chemical reaction, e.g. a conversion of phosphorus-containing minerals present in the raw material.

According to an embodiment of the suggested method providing the alkaline-sulfuric compound is adapted in order to obtain in the mixture a molar ratio of sodium/phosphorus, i.e. Na:P in the range of from 1.0 through 1.8 or 1.1-1.8, preferably in the range of from 1.2 through 1.6 or 1.3-1.6, and a molar ratio of sodium/silicon, i.e. Na:Si of 0.2-0.8, preferably 0.3-0.5. Such molar ratios favourably correspond to an amount of the alkaline-sulfuric compound in the mixture of 10 wt-% through 40 wt.-% of the mixture, preferably to an amount of 20 wt-% through 36 wt.-%, of the mixture.

Advantageously, such molar ratio and/or amount provides sufficient sodium compound to obtain a product which is rich in $CaNaPO_4$.

According to an embodiment of the suggested method a first alkaline-sulfuric compound is at least partly substituted by a second alkaline-sulfuric compound comprising another alkali metal. An alkaline-sulfuric compound can be substituted—at least in part—by an alkali metal carbonate, and/or by an alkali metal hydroxide. Accordingly, a sodium-sulfuric compound is at least partly substituted by a sulfuric compound comprising potassium, by an alkali metal carbonate, and/or by an alkali metal hydroxide.

Advantageously, such sulfuric compounds are commercially available at low or negative cost.

According to an embodiment the suggested method of calcination further comprises providing a carbonaceous reducing agent as an additive.

Advantageously, an activation temperature of the alkaline-sulfuric compound can be lowered to an economically feasible range.

According to a modification of this embodiment above the carbonaceous reducing agent comprises a phosphorus containing material which is selected from sewage sludge or a biomass.

Advantageously, sewage sludge and biomass contain phosphorus. Therefore, their presence as additive allows minimizing dilution of the product by ash. Hence, the efficiency of the process can be increased.

According to an embodiment a fraction of the carbonaceous reducing agent comprises a phosphorus containing material and is a dominant mass fraction of all fractions used in the method of calcination. Particularly, the carbonaceous reducing agent containing the phosphorus comprises a larger mass in comparison to the raw material and in comparison to the alkaline-sulfuric additive.

Advantageously, a high recycling rate of phosphorus and an effective utilization of sewage sludge is obtained.

According to a further modification of the method, the raw material containing whitlockite ($Ca_9(Mg,Fe^{2+})[PO_3(OH)|(PO_4)_6]$), and/or iron phosphate (FePO4), and/or aluminium phosphate ($AlPO_4$), and/or fluorapatite ($Ca_5(PO_4)_3F$) comprises a sewage sludge ash. Such ash can completely be substituted by a carbonaceous reducing agent comprising phosphorus containing material. Advantageously, the raw material is produced during the calcination process itself, particularly during its initial phases. Hence, according to this embodiment, the raw material comprises a carbonaceous reducing agent, wherein the carbonaceous reducing agent encompasses a phosphorus containing material.

Advantageously, energy efficiency of the method is improved.

According to an embodiment the suggested method of calcination further comprises controlling the atmosphere during processing of the raw material with respect to an oxygen concentration, especially during calcining and/or during a cooling during or after calcining. The controlling allows for preventing a loss of sulfur and the removal of heavy metals. As a result of the controlling, the content of sulfur in the product substantially corresponds to the content of sulfur in the mixture during incineration.

Advantageously, minimal or no costs arise for desulfurization of waste gas.

According to an embodiment the sulfur content is made water soluble, at least partly, by mildly oxidizing the product by contact to an oxidizing atmosphere. Such atmosphere may be produced by injecting air at a reduced temperature of 300° C.-700° C., preferably at a temperature of 400° C.-550° C.

Advantageously, the sulfur penetrates the mixture and is homogeneously distributed allowing for efficient conversion.

According to an embodiment the calcining is carried out at a temperature of 800-1100° C., preferably 850-1000° C.

Advantageously, that allows for efficient process operation with equipment already available.

According to an embodiment of the suggested method the raw material is an ash, selected from a sewage sludge ash or a biomass ash.

Such ashes need to be disposed of safely. The process described thus allows recycling phosphorus from waste water and biomass.

According to an embodiment of the suggested method further comprises removing a heavy metal contained in the raw material by vaporization and sublimation of the reduced heavy metal species and separating them from the product by subsequent condensation and retention of the gas phase in a hot gas filter.

Advantageously, release of toxic metals thus can be minimised.

According to an embodiment of the suggested heavy metal removal in particular of Hg, Pb, and Cd is achieved. In particular, 30-90% of the contents of Hg, Pb, and Cd in the educt can be removed by maintaining a reducing atmosphere. More specifically, reduction of a heavy metal is achieved by adding 10-20% of a phosphorus containing carbonaceous reducing agent. Thereby 30-50% of Pb, Cd, and Hg contents are removed.

Advantageously, the reducing atmosphere is adapted to the required magnitude of heavy metal removal. Higher removal rates are achieved by higher ratios of phosphorus containing carbonaceous reducing agent. Advantageously, the reducing atmosphere is maintained by addition of 10-20 wt % of phosphorus containing carbonaceous reducing agent. In this case, removal of Pb, Cd and Hg of 30-50% is achieved.

In case a higher heavy metal removal is required, higher or even very high ratios of phosphorus containing carbonaceous reducing agent of 25-75 wt % can be added by maintaining Na:P ratios defined above. In this case 40-70% of said heavy metals can be removed. If very high heavy metal removal is required, sewage sludge ash is completely substituted by a phosphorus containing carbonaceous reducing agent by maintaining Na:P ratios defined above. In this case 50-90% of the heavy metals can be removed from the product. Advantageously, the ecotoxicologically most relevant heavy metals Cd, Hg, and Pb can be removed effectively from the raw material.

According to an embodiment of the suggested method the alkaline-sulfuric compound is selected from a by-product of an industrial process selected from a rayon fiber production, a pulp manufacture, a paper manufacture. Also an ash obtained by incineration of biomass or sludge or refuse derived fuel or waste can be used as the alkaline-sulfuric compound.

By the incineration of indicated by-products ashes are produced. Such ashes need to be disposed of. Advantageously, they can even be recycled by utilizing. Typically, such by-products and/or ashes contain known amounts of the alkaline-sulfuric compound. Further, these by-products and/or ashes may be available at a negative cost.

According to an embodiment the alkaline-sulfuric compound is selected from rayon production.

Advantageously, such products are available at a negative cost.

According to an embodiment the treating a gas, i.e. the treating of a gas, comprises a desulfurization step in a pollution control system of an incinerator, particularly of an incinerator adapted to the incineration of sewage sludge, biomass, refuse derived fuels and/or waste.

Advantageously, process cycles can be designed which minimize costs. Particularly, if the suggested method is run in parallel to the indicated incineration, storage capacities can be minimized.

According to an embodiment the method described above is used to obtain a phosphate containing fertilizer and/or for sewage sludge utilization, i.e. recycling.

Advantageously, phosphorus can safely be recovered from main secondary sources by converting it into effective phosphorus fertilizers. At the same time sewage sludge and/or sewage sludge ash can be utilized by recycling in an environmentally sound manner.

According to an embodiment a phosphate containing fertilizer is suggested, obtained from sewage sludge ash by applying the calcination method according to the process described above and below.

Advantages correspond to the already mentioned ones.

According to an embodiment a citrate soluble phosphate compound is suggested, which is obtained from a P-containing raw material comprising a P-phase such as whitlockite $Ca_9(Mg,Fe^{2+})[PO_3(OH)|(PO_4)_6]$, iron phosphate $FePO_4$, aluminium phosphate $AlPO_4$ and fluorapatite $Ca_5(PO_4)_3F$. The process used to obtain the phosphate compound, comprising a citrate soluble phosphate encompasses the process steps:

determining in the raw material a molar ratio of Na/Si and a molar ratio of Na/P;

determining a quantity of a sodium-sulfuric compound based on the determined molar ratios;

calcining under reducing conditions the raw material together with the determined quantity of the sodium-sulfuric compound to obtain the citrate soluble phosphate compound.

The process allows P-recovery from sewage sludge which is rich in any of the following: whitlockite, $FePO_4$ and/or $AlPO_4$. Advantages have been already mentioned and are lined out further below.

According to an embodiment determining the quantity for obtaining the compound comprises:

determining a sodium quantity required to obtain the citrate soluble phosphate $CaNaPO_4$ by calcining the P-containing raw material, wherein $CaNaPO_4$ is produced by converting P-phases such as whitlockite, iron phosphate, aluminium phosphate, and/or fluorapatite; and calculating an amount of the sodium-sulfuric compound corresponding to the determined sodium quantity, wherein the sodium-sulfuric compound is selected from $Na_2S$, $Na_2SO_3$, and/or $Na_2SO_4$.

Advantageously, throughout knowledge of possible reactants allows designing optimal reaction conditions for conversion of phosphorus, e.g. from indicated minerals into extractable and/or bioavailable phosphates.

According to said embodiment the sodium quantity used in the calcining process to obtain $CaNaPO_4$ is determined according to formula:

$$n_{Me} = x \cdot n_P + y \cdot n_{Si}.$$

wherein $n_{Me}$ is the amount of sodium expressed in moles, $n_P$ is the amount of phosphorus in the raw material expressed in moles, $n_{Si}$ is the amount of silica in the raw material expressed in moles, whereas x and y are coefficients expressing the consumption of alkali metal in alkali metal consuming reactions during calcining.

Advantageously, by applying such formula the process can be adapted to different raw materials comprising different compositions, i.e. different concentrations of silica and phosphorus.

According to a specification of said embodiment, x in the formula is selected from 0.8-1.8, preferably from 1.0-1.7, particularly from 1.2-1.6 or 1.5-1.8; and y is selected from 0.25-0.6, preferably from 0.3-0.5, in particular from 0.4-0.45. Therein the citrate solubility is detected with aqueous alkaline ammonium citrate or neutral ammonium citrate and comprises 35-100%, preferably 40-95%, in particular 70-90% of a total P content.

Advantageously, the formula can be adapted to any raw material.

According to a specification of the embodiment above the compound is obtained by a process further comprising:

controlling an atmosphere with respect to an oxygen concentration during calcining and/or during a cooling.

Advantageously, loss of reactants, especially of sulfur compounds, can be minimized.

According to a specification such controlling is particularly adapted to prevent accumulation of a pyrite type iron-sulfur-compound $Fe_7S_8$, to prevent complete combustion of the pyrite type iron-sulfur compound $Fe_7S_8$ and/or to obtain a water soluble sulfuric compound with a metal sulfate as a main phase.

Advantageously, the yield of the desired product is improved.

According to a further embodiment the compound described above is used for phosphate recovery.

Therein phosphate recovery can proceed under environmental conditions, i.e. by a biological activity in soil or another substrate for plant growth. Furthermore, recovery can proceed in a technical extraction process. In view of phosphorus being an essential but limited element in nature advantages are evident. In particular, phosphorus can easily be extracted from the obtained citrate soluble phosphate compound, i.e. from the product of the described method of calcination.

Accordingly, it is suggested in yet another embodiment to use the citrate soluble phosphate compound to obtain a phosphorus containing fertilizer.

Phosphorus in such a fertilizer is not water soluble and therefore is released more slowly in comparison to phosphoric acid based fertilizers. The resulting phosphorus containing fertilizer is especially suitable for organic farming.

According to another embodiment a nitrogen containing component is added to the citrate soluble phosphate compound. The nitrogen containing component can be selected, e.g., from a solid salt or from a solution. Typically, the nitrogen containing component comprises ammonium anions and/or urea. It is added to the citrate soluble phosphate compound to obtain the phosphorus containing fertilizer. The obtained mixture can be further processed, e.g. grinded.

As to the chemical composition of the citrate soluble phosphate component, i.e. the product of the suggested incineration process, it is characterized by a high sulfur content. Due to lower atmospheric sulfur deposition in the past decades, sulfur containing fertilizers are increasingly important secondary fertilizers. The product also contains small amounts of Mg as a secondary fertilizer. The product contains trace nutrients as Zn and Cu. The product further contains magnetite, hematite, iron sulfide and aluminum oxide. By addition of CaO, calcium-silico-phosphates can be produced. Therefore, obtainable fertilizers comprise at least NPKS-, NPKCaS-, NPKSCu-, NPKMgCu, and NPK-CaSCu-fertilizers.

With respect to the fine structure of the phosphate compound obtained, the following observations are made: In comparison to rock phosphate, sewage sludge ash contains no fluorapatite. Therefore, lower temperatures can be applied during calcination in comparison to the Rhenania process because no HF needs to be withdrawn. Thus no melt is formed during the process. The product therefore comprises small particles which only slightly agglomerate by slight sintering during the process. Therefore, the product can be easily pulverized to the desired particle size required by the European fertilizer regulation.

According to another embodiment a method is suggested to obtain a phosphorus containing fertilizer. The method comprises:
  providing a citrate soluble phosphate compound or a product;
  grinding, i.e. crushing and/or milling the citrate soluble phosphate compound;
  adding a nitrogen containing component, containing an ammonium anion and/or urea, to the citrate soluble phosphate compound to obtain a mix;
  granulating the mix to a specific grain size.

Particularly, all components added into the mix are thoroughly mixed homogenizing the mix with respect to the composition. Advantageously, a valuable fertilizer is obtained. By analyzing the chemical composition of the product resulting from the suggested incineration process (i.e. if the elemental composition of the citrate soluble phosphate compound with respect to such elements like, e.g., Cu, Mg is known) micronutrients can be added to the mixed material for obtaining a valuable fertilizer.

The embodiments described above can be freely combined with each other.

In view of waste water and hence sewage sludge being major phosphorus carriers, their treatment for phosphorus removal gained attention. Phosphorus in sewage sludge ashes is mainly present as whitlockite ($Ca_9(Mg,Fe^{2+})[PO_3(OH)|(PO_4)_6]$), iron phosphate ($FePO_4$) and aluminium phosphate ($AlPO_4$) whereas in phosphate rock it mainly is present as fluorapatite ($Ca_5(PO_4)_3F$). However, the bioavailability of phosphorus from these sources is limited. Therefore, the direct use of sewage sludge ashes or phosphate rock as fertilizer is inefficient. Furthermore, the direct use of ashes as fertilizer is limited due to high contents of heavy metals.

In order to evaluate the bioavailability of phosphorus to plants, its concentrations in ammonium citrate solution extracts of the sample under consideration is used, wherein high citrate solubility indicates high plant availability on cropland.

Based on the hypothesis that $CaNaPO_4$ for its excellent solubility in ammonium citrate solution could be considered as the ideal phosphorus fertilizer produced from ash, throughout knowledge of the elemental composition of given ashes uses as a raw material could provide an understanding of the additives required to arrive at it.

In GB 473520 the consumption of alkali metal (Me) by the phosphate rock is stated as a molar ratio with regard to the phosphate content. Different from phosphate rock, sewage sludge ashes contain considerable fractions of Fe, Al, and Si oxides beside to the phosphorus bearing compounds. Their concentrations vary over a wide range depending on the origin of the waste water and water treatment technologies.

In view of the above, sewage sludge ashes of different origin were analyzed with respect to molar Na/Si content, molar Na/P content and solubility of phosphorus in ammonium citrate solution.

In order to better understand the influence of the elemental balance in the raw material a thoroughly defined sewage sludge ash was spiked with varying amounts of alkali metal, i.e. sodium components. In particular, sodium was added either as $Na_2CO_3$ or $Na_2SO_4$ or both and the mixture was treated under reducing conditions. Corresponding experimental data are represented in FIG. 1. Therein the solubility of phosphorus in aqueous alkaline ammonia citrate ($P_{AAC}$) of the reduced samples, i.e. model ash admixtures, is plotted against the molar ratios Na:Si (Na/Si) and Na:P (Na/P).

A region of linear increase of phosphorus solubility was observed (cf. FIG. 1). Moreover, this region corresponds to the formation of phosphorus compounds which are identical or similar to the model compound $CaNaPO_4$ which was verified by XRD analysis. Curve fitting reveals that the total amount of alkali metal (Me) needed for the reaction can be expressed as $$n_{Me}=x \cdot n_P + y \cdot n_{Si}, \quad (1)$$

where $n_{Me}$ is the amount (mol) of alkali metal needed in order to achieve full citrate solubility, $n_P$ is the amount (mol) of P in the sewage sludge ash, $n_{Si}$ is the amount (mol) of Si in the sewage sludge ash, whereas x and y are coefficients expressing the consumption of alkali metal in the two alkali metal consuming reactions.

Thus, it has been found that preferable values for full citrate solubility are within the ranges of x=0.8-1.8, preferably in the range x=1.0-1.7, in particular in the range x=1.2-1.6, even in the range from x=1.5-1.8; and for y=0.25-0.6, preferably in the range y=0.3-0.5, in particular in the range y=0.4-0.45.

In view of the above, the correlation of alkali metal consumption with both the Si and the P content of sewage sludge ashes comprises a first technical feature identified, based on the above hypothesis. It allows predicting the consumption of additives for reductive treatment of a wide range of sewage sludge ashes, other biomass ashes and related raw materials for phosphorus removal.

In order to study the influence of sulfur on the formation of $CaNaPO_4$, different alkali metal sulfates have been used for a given ash sample. The sample was composed of: 16.5 wt % Fe, 13.7 wt-% Si, 12.2 wt-% Ca, 7.1 wt-% P, 3.4 wt-% Al. Thus, 1 kg of this ash comprises approximately 4.8 mol Si and 2.3 mol P.

Thus between 1.2-2.9 mol, preferably between 1.4-2.4 mol and in particular between 1.9-2.2 mol of Na are added with regard to the Si content in the ash and between 1.8-4.1 mol, preferably between 2.3-3.9 mol and in particular between 2.8-3.7 mol and even 3.5-4.1 mol of Na are added with regard to the P content in the ash and thus in total between 3.0-7.0 mol, preferably between 3.7-6.3 mol and in particular between 4.7-5.9 mol and even 5.4-6.3 mol of Na are added to 1 kg of ash.

Considering the use of $Na_2S$ as an alkali-sulfuric compound, between 117-273 g, preferably between 144-246 g and in particular between 183-230 g and even 211-246 g of $Na_2S$ would need to be added in order to reach bioavailable phosphates.

Considering the use of $Na_2SO_3$ as an alkali-sulfuric compound, between 189-441 g, preferably between 233-397 g, and in particular between 296-372 g and even 341-397 g of $Na_2SO_3$ would need to be added for each kg of raw ash in order to reach bioavailable phosphates.

Considering the use of $Na_2SO_4$ as an alkali-sulfuric compound, between 213-497 g, preferably between 263-447 g, and in particular between 334-419 g and even 384-447 g of $Na_2SO_4$ would need to be added for each kg of raw ash in order to reach bioavailable phosphates.

Similar ratios would apply to equivalent potassium compounds, i.e. $K_2S$, $K_2SO_3$, and $K_2SO_4$.

Experiments have shown that in order to attain >85% citrate solubility, 3.5-4 mol Na per mol P, corresponding to 40-50 wt-% of an average phosphoric starting material are needed if the preferred alkaline source soda ash is used. If soda ash is substituted by an alkali-sulfuric compound, >85% citrate solubility is reached also at considerably lower Na:P ratios.

However, the use of some sodium-sulfuric compounds as additives exhibits the disadvantage that a carbonaceous additive is required in order to reduce the activation temperature to economically feasible ranges. E.g. with sodium sulfate at 1000° C. no formation of citrate soluble phosphate takes place if no reducing agent is added. Thus, the reductive activation of sulfates or sulfites is mandatory for initiating the reactivity of the alkali metal for the reaction with silicates and phosphorus compounds.

Notwithstanding, the metal oxide fractions contained in the sewage sludge ash (such as $Fe_2O_3$) also have an influence on the amount of reducing agent required for activation of alkali metal sulfates or sulfites. Thus, the consumption of the reducing agent also has to be adjusted to the given composition of the raw material, e.g. a sewage sludge ash.

However, the use of carbonaceous additives such as solid fossil fuels as a reducing agent may diminish the P content in the resulting fertilizer by dilution with ash resulting from the reducing agent. Therefore, according to the present invention a phosphorus containing reducing agent as e.g. sewage sludge is suggested. Preferably, the reducing agent is dried or dehumidified. The use of sewage sludge ashes thus represents a second technical feature in order to maintain high P contents in the product.

Sewage sludge and sewage sludge ashes contain considerable fractions of heavy metals. In order to be used as a fertilizer, the product must comply with legal threshold values. Heavy metal depletion is important for other use of the product as well. During the treatment process, heavy metals are transferred to the gas phase and can be separated from the product. This is achieved by reduction of the heavy metal oxide to its elementary form by a reducing agent, evaporation or sublimation of said heavy metal and abstraction of the heavy metal with the gas phase. The fractions of heavy metals which need to be removed depend on the concentration of heavy metals in the sewage sludge and/or sewage sludge ash.

A higher fraction of heavy metals can be removed by either higher temperatures or increased concentrations of the reducing agent. However, caking of the material in the rotary furnace used limits the maximal temperature applicable. Depending on the sewage sludge ash composition, the alkali metal compound and its mass fraction, a temperature of 850-1000° C. was found to achieve best results for both heavy metal removal and stable operation.

In view of the observations above, it is suggested to replace soda ash or Glauber's, salt at least partially, by a dry sodium-sulfuric compound such as $Na_2S$, $Na_2SO_3$ or $Na_2SO_4$. These dry sodium-sulfuric compounds are preferably obtained as by-products from industrial processes (e.g. rayon production) or as reaction products of gas desulfurization processes based on $NaHCO_3$ or NaOH. The suggested use of dry sodium-sulfuric compounds comprises a third technical feature of the present invention.

In contrast to Glauber's salt, the proposed sulfuric compounds are available as dry material, thus saving evaporation energy and carbonaceous reducing agent. In addition, released $SO_2$ from $Na_2S$, $Na_2SO_3$ or $Na_2SO_4$ combines with liberated CaO. Therefore, in contrast to previously used soda ash, using sodium sulfuric compounds is suggested in order to produce completely citrate soluble phosphate compounds at a much lower molar ratio of Na per mol P. If available as waste materials, the costs of said sodium sulfuric compounds are comparatively low. Advantageously, the sodium sulfuric material may even be available at a negative cost.

According to an embodiment of the proposed process the thermal treatment of phosphoric starting materials with the sodium-sulfuric reactant and a carbonaceous reducing agent may be performed in two stages: a reducing stage followed by an oxidizing stage.

The reducing stage is necessary to elicit the chemical reactions whereby the starting compounds are decomposed and the desired phosphate compounds are built. However, under reducing conditions sulfur is incorporated in hardly soluble, pyrite type iron-sulfur-compounds ($Fe_7S_8$).

According to the invention introducing an oxidizing stage downstream of the reducing stage in the same reactor is suggested for obtaining water soluble sulfuric compounds with sodium sulfate as a main phase. In addition, the proposed process has the advantage of avoiding a separate post-combustion chamber to oxidize CO being formed in the reducing stage of the reactor, i.e. kiln.

Advantageously, the oxidizing stage is carefully controlled in terms of oxygen concentration in order to avoid complete combustion of the pyrite type iron-sulfur compounds. Supplying air or oxygen into the reactor could be used. Such would entail the unfavorable release of $SO_2$ to the gaseous phase and its entrainment with the off-gases.

The process is performed in a thermal reactor, preferably in a rotary kiln, at temperatures of 700-1100° C., preferably at 850-1000° C. The sodium-sulfuric compounds containing material is added in an amount of 10-40 wt.-%, preferably 20-36 wt.-% of the starting material. The exact amount depends on the degree of citrate acid solubility to be attained (70-100%) and the chemical composition, in particular the P and Si concentration, of the starting materials according to formula (1) above.

Examples of the described embodiments comprise:

1. A calcination process using a sodium-sulfuric compound to convert the poorly plant available phosphate compounds whitlockite $Ca_9(Mg,Fe^{2+})[PO_3(OH)|(PO_4)_6]$, as the main P-phase in sewage sludge and biomass ash, as well as fluorapatite $Ca_5(PO_4)_3F$, as the main P-phase in phosphate rock, to citrate soluble phosphate compounds with $CaNaPO_4$ as the main phosphate phase.

2. A calcination process using a sodium-sulfuric compound which is characterized in being the by-product of industrial processes aiming at the production of different materials (e.g. rayon).

3. A calcination process using a sodium-sulfuric compound which is characterized in being the reaction product of gas desulfurization with sodium based reactants such as but not limited to NaOH or $NaHCO_3$.

4. A calcination process using a sodium-sulfuric compound which is characterized in that it is produced in an air pollution control system of sewage sludge and biomass incinerators.

5. A calcination process using a sodium-sulfuric compound which is characterized in that it is mixed with another alkaline source according to the proceeding examples and another sodium or potassium based alkaline source as described in the documents cited above.

6. A calcination process using a sodium-sulfuric compound which is characterized in that the amount in which it is added is correlated to the phosphorus and the silicon content in the sewage sludge ash.

7. A calcination process using a sodium-sulfuric compound which is characterized in that it is added in a molar ratio of Na:P of 1.0-1.8, preferably 1.2-1.6 and furthermore is added in a molar ratio of Na:Si of 0.2-0.8, preferably 0.3-0.5, corresponding to an amount of 10 to 40 wt.-%, preferably 20-36 wt.-%, of the raw material secondary phosphate source.

8. A calcination process in which the amount of an alkali metal compound added to sewage sludge ash is correlated to the phosphorus and the silicon content in the sewage sludge ash according to example 5 and in molar ratios as stated in example 6, and where the sodium-sulfuric compound is completely or partly substituted by another alkali metal carbonate, alkali metal sulfate or alkali metal hydroxide as e.g. but not limited to $K_2SO_4$, $K_2SO_3$, KOH, $Na_2CO_3$.

9. A calcination process using a sodium-sulfuric compound which is characterized in that it is added in combination with a carbonaceous reducing agent in order to both remove heavy metals and activate the sodium-sulfuric compound.

10. A calcination process using a sodium-sulfuric compound which is characterized in that it is added in combination with a phosphorus containing carbonaceous reducing agent as e.g. dry sewage sludge.

11. A calcination process using a sodium-sulfuric compound which is characterized in that its sulfur content completely remains in the product by controlling the atmosphere throughout the calcining process and in particular during the cooling process.

12. A calcination process using a sodium-sulfuric compound which is characterized in that its sulfur content is partly made water soluble by a secondary mild oxidation step, where the product is allowed to have contact to an oxidizing atmosphere which may be air at a reduced temperature of 300-700° C., preferably 400-550° C.

13. A calcinations process which is operated at 800-1100° C., preferably 850-1000° C., which is the maximal stable operation temperature at which baking of the product in the rotary furnace is avoided.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

The invention claimed is:

1. A method of calcination, comprising:
providing a raw material comprising whitlockite $Ca_9(Mg, Fe^{2+})[PO_3(OH)|(PO_4)_6]$, and/or iron phosphate $FePO_4$, and/or aluminium phosphate $AlPO_4$ and/or fluorapatite $Ca_5(PO_4)_3F$;
providing an alkaline-sulfuric compound as an additive;
providing a carbonaceous reducing agent as a second additive;
calcining a mixture of the raw material with the additives comprising reductive activation of the alkaline-sulfuric compound; and
obtaining a product, wherein the product comprises a citrate soluble phosphate compound,
wherein the carbonaceous reducing agent comprises a phosphorus containing material, selected from a sewage sludge or a biomass.

2. The method according to claim 1, wherein the citrate soluble phosphate compound comprises $CaNaPO_4$.

3. The method according to claim 1, wherein the calcining proceeds under reducing conditions at a temperature of 800-1100° C.

4. The method according to claim 1, wherein $CaNaPO_4$ is a main phosphate phase.

5. The method according to claim 1, wherein the alkaline-sulfuric compound is selected from a sodium-sulfuric compound or a potassium sulphuric compound.

6. The method according to claim 1, wherein the raw material contains a silicon, and an amount of the alkaline-sulfuric compound is correlated to a content of a phosphorus in the raw material and a content of the silicon.

7. The method according to claim 1, wherein providing the alkaline-sulfuric compound is adapted to obtain in the mixture a molar ratio of Na:P of 1.1-1.8, and a molar ratio of Na:Si of 0.2-0.8, corresponding to an amount of 10 to 40 wt. % of the mixture.

8. The method according to claim 5, wherein a first alkaline-sulfuric compound is at least partly substituted by a second alkaline-sulfuric compound comprising another alkali metal, and/or by an alkali metal carbonate, and/or by an alkali metal hydroxide.

9. The method according to claim 1, wherein the calcining proceeds under reducing conditions at a temperature of 850-1000° C.

10. The method according to claim 1, wherein a fraction of the carbonaceous reducing agent comprises a phosphorus containing material and is a dominant mass fraction.

11. The method according to claim 1, wherein a sewage sludge ash contained in the raw material is completely substituted by a carbonaceous reducing agent comprising phosphorus containing material.

12. A method of calcination, comprising:
providing a raw material comprising whitlockite $Ca_9(Mg, Fe^{2+})[PO_3(OH)|(PO_4)_6]$, iron phosphate $FePO_4$, aluminium phosphate $AlPO_4$, or fluorapatite $Ca_5(PO_4)_3F$;
providing an alkaline-sulfuric compound as an additive;
providing a carbonaceous reducing agent as a second additive;
calcining a mixture of the raw material with the additives comprising reductive activation of the alkaline sulfuric compound;
obtaining a product, wherein the product comprises a citrate soluble phosphate compound; and
controlling an atmosphere with respect to an oxygen concentration during calcining or during a cooling, wherein a content of sulfur in the product substantially corresponds to the content of sulfur in the mixture,
wherein the raw material is an ash selected from a sewage sludge ash or a biomass ash.

13. The method according to claim 12, wherein the content of sulfur is water soluble, at least partly, by mildly oxidizing the product by contact to an oxidizing atmosphere or air at a reduced temperature of 300-700° C.

14. The method according to claim 12, wherein calcining is carried out at a temperature of 800-1100° C. to obtain a stable operation condition by avoiding a baking of the product.

15. The method according to claim 12, further comprising:
removing a heavy metal, comprising Pb, Cd, and Hg contained in the raw material by vaporization and sublimation of the reduced heavy metal species.

16. The method according to claim 15, wherein reduction of a heavy metal is achieved by adding 10-20% of a phosphorus containing carbonaceous reducing agent and removing 30-50% of Pb, Cd, and Hg.

17. The method according to claim 15, wherein reduction of a heavy metal is achieved by adding 25-75% of a phosphorus containing carbonaceous reducing agent and removing 40-70% of Pb, Cd, and Hg.

18. A method of calcination, comprising:
provide a raw material comprising whitlockite $Ca_9(Mg, Fe^{2+})[PO_3(OH)|(PO_4)_6]$, iron phosphate $FePO_4$, aluminium phosphate $AlPO_4$, or fluorapatite $Ca_5(PO_4)_3F$;
providing an alkaline-sulfuric compound as an additive;
providing a carbonaceous reducing agent as a second additive;
calcining a mixture of the raw material with the additives comprising reductive activation of the alkaline sulfuric compound; and
obtaining a product, wherein the product comprises a citrate soluble phosphate compound,
wherein the alkaline-sulfuric compound is selected from a by-product of an industrial process selected from a rayon fiber production, a pulp manufacture, ora paper manufacture,
or the alkaline-sulfuric compound is selected from biomass, sludge, refuse derived fuel or waste incineration.

19. A process for obtaining a citrate soluble phosphate compound from a P-containing raw material, the raw material comprising a P-phase selected from whitlockite $Ca_9(Mg, Fe^{2+})[PO_3(OH)|(PO_4)_6]$, iron phosphate $FePO_4$, aluminium phosphate $AlPO_4$ or fluorapatite $Ca_5(PO_4)_3F$, the process comprising:
determining in the raw material a molar ratio of Na/Si and a molar ratio of Na/P;
determining a quantity of a sodium-sulfuric compound based on the determined molar ratio of Na/Si and Na/P;
calcining under reducing conditions the raw material together with the determined quantity of the sodium-sulfuric compound to obtain the citrate soluble phosphate compound;
wherein the step of determining the quantity of the sodium sulfuric compound comprises:
detecting a sodium quantity required to obtain by calcining the raw material the citrate soluble phosphate compound $CaNaPO_4$ by conversion of the P-phase; and
calculating an amount of the sodium-sulfuric compound corresponding to the detected sodium quantity, wherein the sodium-sulfuric compound is selected from $Na_2S$, $Na_2SO_3$, or $Na_2SO_4$.

20. The process according to claim 19, wherein the sodium quantity is detected according to the following formula $$n_{Me} = x \cdot n_P + y \cdot n_{Si},$$

wherein $n_{Me}$ is the amount of sodium expressed in moles, $n_P$ is the amount of phosphorus in the raw material expressed in moles, $n_{Si}$ is the amount of silica in the raw material expressed in moles, whereas x and y are coefficients expressing the consumption of alkali metal in alkali metal consuming reactions during calcining.

21. The process according to claim 20 wherein x is selected from the range of 0.8-1.8; and y is selected from the range of 0.25-0.6,
and wherein the citrate solubility is detected with aqueous ammonium citrate and comprises 35-100% of a total P content.

22. The process according to claim 19, further comprising:
controlling an atmosphere with respect to an oxygen concentration during calcining or during a cooling.

23. The process according to claim 22, wherein the step of controlling is adapted to prevent accumulation of a pyrite type iron-sulfur-compound $Fe_7S_8$; to prevent complete combustion of the pyrite type iron-sulfur compound $Fe_7S_8$ and/or to obtain a water soluble sulfuric compound with sodium sulfate as a main phase.

* * * * *